No. 818,922. PATENTED APR. 24, 1906.
DE WITT W. STRICKLAND.
CULTIVATOR AND PLANTER.
APPLICATION FILED MAY 19, 1905.

2 SHEETS—SHEET 1.

Inventor
D. W. Strickland

Witnesses

By
R. A. B. Lacey, Attorneys

No. 818,922. PATENTED APR. 24, 1906.
DE WITT W. STRICKLAND.
CULTIVATOR AND PLANTER.
APPLICATION FILED MAY 19, 1905.
2 SHEETS—SHEET 2.
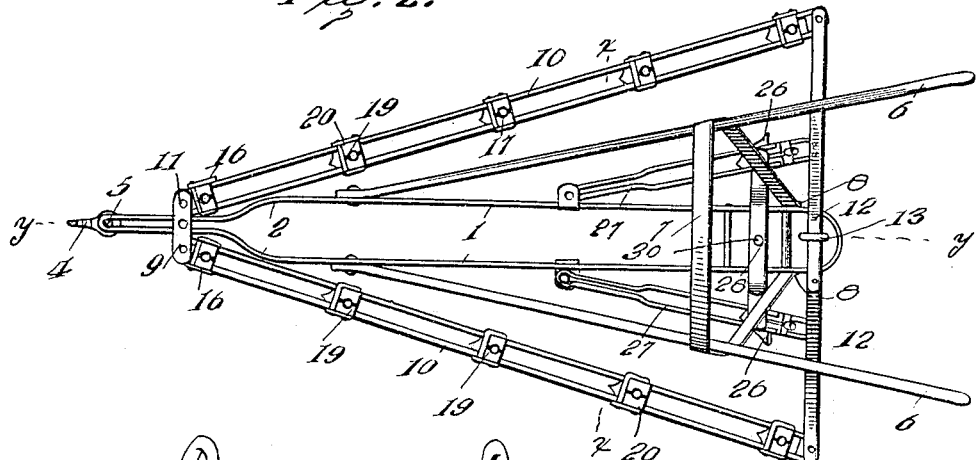
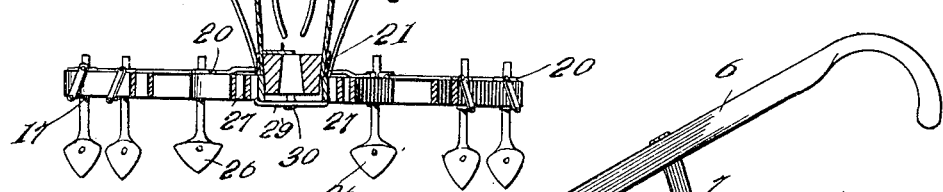
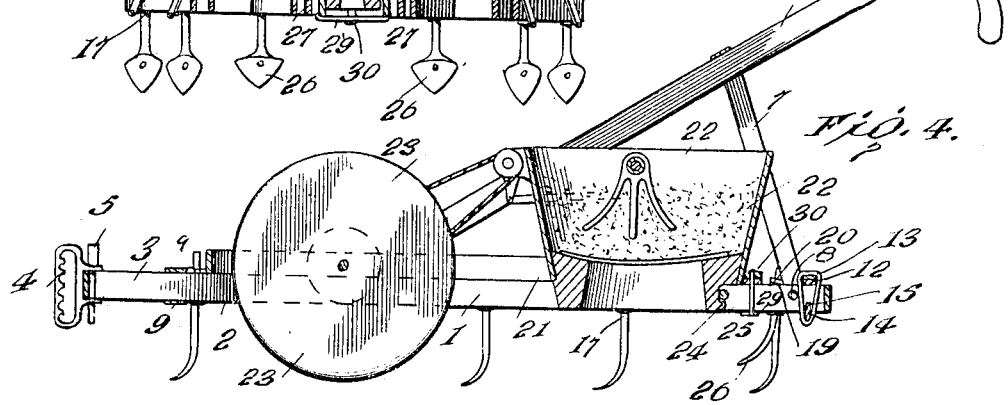
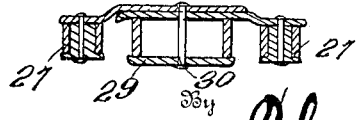

UNITED STATES PATENT OFFICE.

DE WITT W. STRICKLAND, OF MAGNOLIA, MISSISSIPPI.

CULTIVATOR AND PLANTER.

No. 818,922.     Specification of Letters Patent.     Patented April 24, 1906.

Application filed May 19, 1905. Serial No. 261,243.

*To all whom it may concern:*

Be it known that I, DE WITT W. STRICKLAND, a citizen of the United States, residing at Magnolia, in the county of Pike and State of Mississippi, have invented certain new and useful Improvements in Cultivators and Planters, of which the following is a specification.

This invention appertains to agricultural machinery of the type designed for cultivating the soil and distributing seed and fertilizer therein, the purpose being to provide an implement of the character aforesaid comprising interchangeable parts, whereby the machine may be used either for preparing the ground, sowing seed, or cultivating the plants separately or at one and the same operation.

In its organization the implement comprises a beam of novel formation, a planter attachment detachably fitted thereto, toothed bars having adjustable connection with the beam to admit of varying the transverse extent of the tract covered by the implement when drawn over the field, and covering mechanism for throwing the earth over the seed or fertilizer, as the case may be.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1:
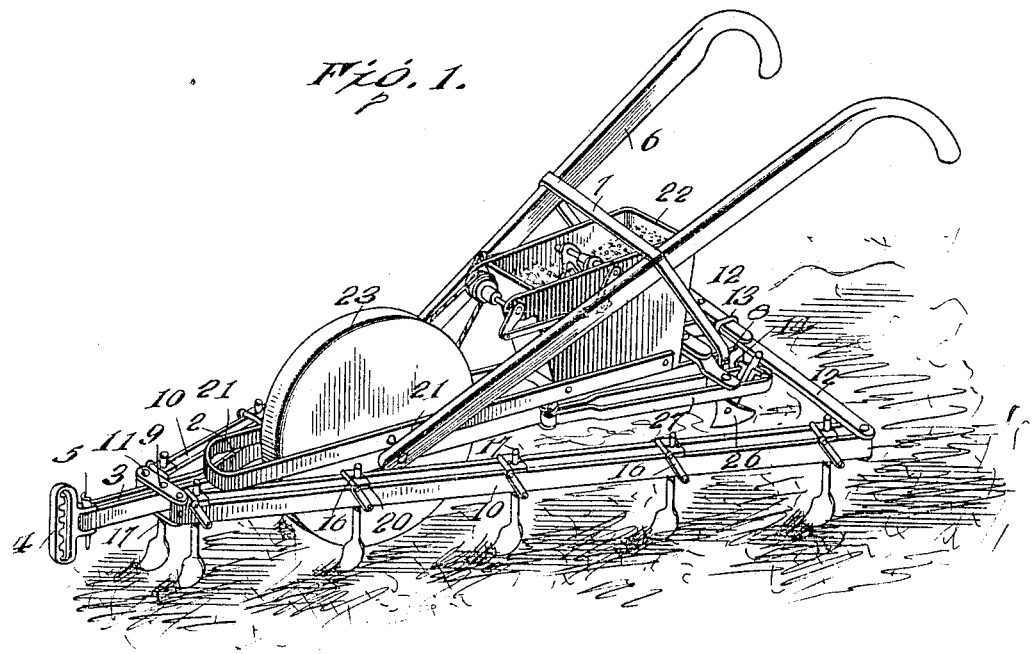
Figure 5:
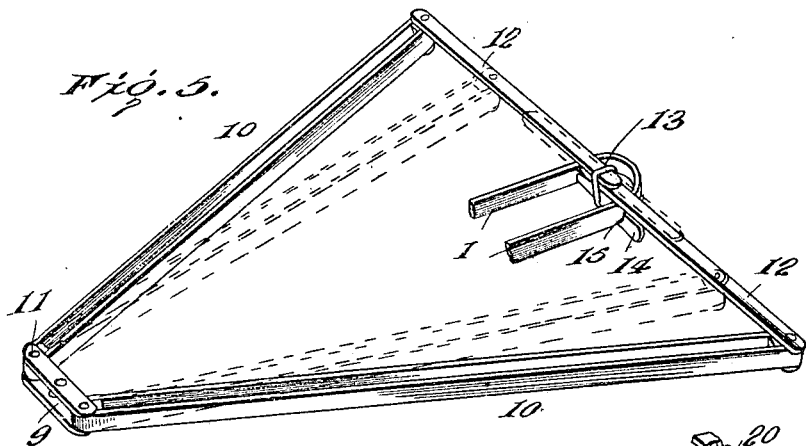
Figure 6:
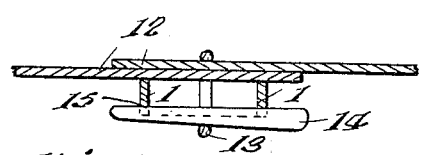
Figure 8:

Figure 1 is a perspective view of a cultivator and planter embodying the invention. Fig. 2 is a top plan view thereof. Fig. 3 is a transverse section on the line *x x* of Fig. 2 looking to the rear, the planter being in position. Fig. 4 is a vertical longitudinal section on the line *y y* of Fig. 2. Fig. 5 is a detail perspective view of the cultivator attachment disconnected from the beam, the dotted lines showing an adjusted position. Fig. 6 is a sectional view showing the means for securing the rear ends of the cultivator-bars in an adjusted position. Fig. 7 is a view similar to Fig. 6, showing the means for securing the rear ends of the covering-bars in an adjusted position. Fig. 8 is a detail view of the means for securing a cultivator tooth or shovel to its bar.

Corresponding and like parts are referred to in the following description and indicated in all the views of the drawings by the same reference characters.

The beam is straight and comprises similar members 1, having an offset 2 near their front ends to bring the parts 3 close together, so as to receive the clevis-fastening, tooth, or other desired part. The beam is preferably constructed of a metal bar bent upon itself into the form substantially as shown, the end portions of the bar being welded or otherwise joined to form, in effect, an integral structure. A beam constructed in this manner is comparatively light and capable of resisting considerable wear and strain and may be easily handled.

The clevis 4 may be of any usual construction and is attached to the front end of the beam by means of a bolt or other fastening 5, the latter passing through rearwardly-extended lugs of the clevis and through the space formed at the front end of the beam at the fold of the bar. The handle-bars 6 are bolted or otherwise fastened at their lower ends to the side members of the beam and are supported by means of a brace-frame 7 of approximately triangular form, said frame being formed of a bar made fast to the handle-bars and having its end portions bent downwardly and inwardly and attached to the rear portion of the beam by means of a fastening 8.

The cultivator is in the nature of an attachment and may be removably and adjustably fitted to the beam, as shown most clearly in Fig. 5, and comprises a cross-piece 9 and side bars 10. The cross-piece 9 is formed of companion members vertically spaced, so as to receive between them the contracted forward portion of the beam. These members are clamped to the beam by bolts or like fastenings 11, passed through registering openings formed therein, the middle bolt or fastening having position between the two contracted parts 3, as shown. The bars 10 are pivotally connected at their front ends to the cross-piece 9 and are laterally adjustable at their rear ends. Connecting-bars 12 are pivoted to the rear ends of the bars 10 and overlap each other at their inner ends, which bars are secured to the rear portion of the beam by suitable fastening means. As shown, a link 13 embraces the overlapped ends of the connecting-bars 12, and a transverse key 14 is passed through an end of the link and engages with the members 1 of the beam and secures the parts in an adjusted position. To prevent slipping of the key 14, the lower edge of the members 1 is notched, as shown at 15. The outermost fastenings 11, connecting the parts of the cross-piece 9, are adapted to engage with the offset portions 2 of the beam members, so as to limit the rearward movement of the cultivator or harrow attachment when placed in position and to prevent possible displacement should said fastenings become loosened from any cause.

Each of the cultivator-bars 10 is of similar formation and comprises transversely-spaced members, between which are received the shanks of the teeth or cultivator-shovels and the blocks coöperating therewith. A clip 16 is provided for each tooth or cultivator-shovel and embraces the companion members or parts comprising each cultivator-bar and has a diagonal arrangement whereby one member of the clip extends in front of the block and the other member in the rear thereof. The shank 17 of the teeth or shovel-blades is rounded to admit of adjusting the tooth or blade to any angular position. The mounting for each tooth consists of companion blocks 19, having half-round grooves in their meeting faces which unitedly form an opening to receive the shanks 17. Companion blocks 19 have outer flanges 20 at their upper ends to overlap the members of the cultivator-bars to prevent their downward displacement. The blocks are normally spaced apart to admit of their being drawn together by the clips, so as to clamp the shanks of the tooth or shovel-blades. The respective mountings are adjustable in the space formed between the companion members of a cultivator-bar, both the mountings and the teeth being secured in an adjusted position by tightening the respective coöperating clips.

The attachment for depositing either seed or fertilizer comprises a frame 21, adapted to rest upon the beam and provided with the hopper for containing the grain or fertilizer and with the operating mechanism for effecting a positive discharge thereof. A hopper 22 is provided at the rear end of the frame 21 and a ground-wheel 23 is arranged at the front end of said frame, suitable connections being interposed between the ground-wheel and the agitating means to insure positive supply of the grain or fertilizer in the operation of the mechanism. The base of the hopper is constructed to fit snugly between the companion bars 1 of the beam, whereas the frame 21 rests upon said bars or members.

The reduced portion of the base is formed at its rear end with a hook 24 to make positive engagement with a transverse rod or bar 25, so as to hold the hopper in position and prevent vertical and rearward displacement thereof. The front end of the frame 21 is free to have a limited vertical play, thereby adapting the ground-wheel 23 to follow irregularities in the surface of the soil. The weight of the attachment is sufficient, in connection with the hook 24, transverse rod 25, and the reduced portion of the base of the hopper, to retain the attachment in position under normal conditions.

Covering-shovels 26 are arranged in the rear of the planter and fertilizer-distributer and are carried by bars 27, which are preferably pivotally connected at their front ends to side members of the beam, connecting-bars 28 serving to secure the rear ends of the bars 27 to each other and to the beam in an adjusted position. A gland 29 is arranged beneath the beam and engages with the members thereof, and a bolt or like fastening 30 connects the parts in an adjusted position. The covering-shovels 26 are preferably attached to their supporting-bars 27 in substantially the same manner as the cultivator-teeth to the cultivator-bars to admit of their adjustment both vertically and angularly.

An implement constructed substantially as herein set forth may be used either as a cultivator or harrow or for depositing seed or fertilizer or for both purposes at the same time. When used as a cultivator or harrow, the planting attachment is removed. Should it be required to distribute fertilizer or to deposit seed the cultivator attachment may be disconnected from the beam and the frame 21 and attached parts placed in position. As the machine is drawn over the field the forward end of the frame 21 is free to move vertically to admit of the ground-wheel 23 adapting itself to the surface of the soil.

Within the purview of the invention any means may be employed for effecting a positive discharge of the ferilizer or seed, and connections of any kind may be resorted to for positively actuating the agitating means from the ground-wheel 23.

Having thus described the invention, what is claimed as new is—

1. In a device of the character described a beam comprising parallel side members converging at their forward ends to produce an offset constituting stop-shoulders, a cross-piece receiving the converging ends of the beam and embodying upper and lower members, fastenings connecting said members, the outermost fastenings being adapted to abut against said stop-shoulders to limit the rearward movement of the cross-piece, and the middle fastening being inserted between the converging ends of the beam members, cultivator-bars pivoted at their front ends between the members of the cross-piece and carrying teeth, and an extensible connection between the rear ends of said cultivator-bars.

2. In a device of the character described a beam comprising similar side members having converging forward ends forming offsets constituting stop-shoulders, a cross-piece slipped upon the contracted forward ends of the beam and comprising upper and lower members, fastenings connecting said members and adapted to engage with the stop-shoulders of the beam members, whereby to limit the movement of said cross-piece, a middle fastening connecting the members of said cross-piece and inserted between the converged ends of the beam members, cultivator-bars pivoted at their front ends between the ends of the members forming said cross-piece and carrying cultivator-teeth, connecting-bars pivoted at their outer ends to the rear face of the cultivator-bars and having their inner ends overlapped, a link embracing said overlapped ends, and a wedge-key inserted between one side of said link and the adjacent edges of the beam members as and for the purpose set forth.

In testimony whereof I affix my signature in presence of two witneses.

DE WITT W. STRICKLAND. [L. S.]

Witnesses:
M. M. HART,
HOMER HART.